(12) United States Patent
Bowen

(10) Patent No.: US 6,460,425 B1
(45) Date of Patent: Oct. 8, 2002

(54) TWIN CLUTCH AUTOMATED TRANSMISSION

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 18 days.

(21) Appl. No.: 09/760,311

(22) Filed: Jan. 10, 2001

(51) Int. Cl.$^7$ ................................................ F16H 3/08
(52) U.S. Cl. ........................... 74/331; 74/331; 74/335; 74/730.1
(58) Field of Search .................... 74/331, 333, 335, 74/336 R, 330, 730.1, 732.1

(56) References Cited

U.S. PATENT DOCUMENTS

| | | | | |
|---|---|---|---|---|
| 5,234,087 A | * | 8/1993 | Jurgens et al. ............. | 192/3.58 |
| 5,492,034 A | * | 2/1996 | Bogema ..................... | 74/730.1 |
| 5,711,409 A | * | 1/1998 | Murata ..................... | 192/87.11 |
| 5,890,392 A | | 4/1999 | Ludanek et al. ............. | 74/331 |
| 5,966,989 A | | 10/1999 | Reed, Jr. et al. ............. | 74/331 |
| 6,209,406 B1 | | 4/2001 | Sperber et al. ............... | 74/330 |
| 6,209,407 B1 | | 4/2001 | Sperber et al. ............... | 74/331 |

FOREIGN PATENT DOCUMENTS

JP 408093861 * 4/1996

* cited by examiner

Primary Examiner—Sherry Estremsky
Assistant Examiner—Tisha D. Lewis
(74) Attorney, Agent, or Firm—Harness, Dickey & Pierce P.L.C.

(57) ABSTRACT

An automated twin-clutch multi-speed transmission includes a first engine clutch operable to establish a releasable drive connection between the engine and a first input shaft, a second engine clutch operable to establish a releasable drive connection between the engine and a second input shaft, an output shaft and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches and the power-operated dog clutches. A clutch control system includes a first hydraulic pump driven by the first input shaft, a second hydraulic pump driven by the second input shaft, and flow control valving for controlling fluid flow between the first and second pumps.

18 Claims, 4 Drawing Sheets

TWIN CLUTCH AUTOMATED TRANSMISSION

FIELD OF THE INVENTION

The present invention relates generally to transmissions for use in motor vehicles and, more particularly, to a twin-clutch automated transmission applicable for use in drive and rear-wheel drive vehicles.

BACKGROUND OF THE INVENTION

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

SUMMARY OF THE INVENTION

Accordingly, it is an object of the present invention to provide a twin-clutch transmission and a control system for permitting automatic shifting of the twin-clutch transmission.

This and other objects of the present invention are met by providing an automated twin-clutch multi-speed transmission adapted to transfer power from the engine to the driveline of a motor vehicle. The transmission includes a first engine clutch operable to establish a releasable drive connection between the engine and a first input shaft, a second engine clutch operable to establish a releasable drive connection between the engine and a second input shaft, an output shaft adapted to transfer power to the driveline, and a geartrain for selectively establishing a plurality of forward and reverse speed ratio drive connections between the input shafts and the output shaft. The transmission further includes power-operated dog clutches for selectively engaging constant-mesh gearsets associated with the geartrain, and a transmission controller for controlling coordinated actuation of the first and second engine clutches and the power-operated dog clutches to permit non-power interrupted ("powershift") sequential gear changes automatically without input from the vehicle operator. A clutch control system includes a first hydraulic pump driven by the first input shaft for delivering high-pressure fluid to a first control valve associated with the first engine clutch, a second hydraulic pump driven by the second input shaft for delivering high-pressure fluid to a second control valve associated with the second engine clutch, and flow control valving for controlling fluid flow between the first and second pumps. When shifting under power between gear ratios, one engine clutch is released such that the pump associated with the driven input shaft supplies fluid to the pump associated with released input shaft for causing acceleration/deceleration of the released input shaft into synchronization with the output shaft. Following completion of speed synchronization, the dog clutch for the selected gearset associated with the released input shaft is actuated and thereafter the released engine clutch is re-engaged and the engaged engine clutch is released.

In accordance with an alternative arrangement, the clutch control system can include a single control valve in combination with an engine clutch assembly operable for selectively establishing drive connections between the engine and each of the first and second input shafts.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the scope of this invention will become apparent to those skilled in the art.

DETAILED DESCRIPTION OF THE PREFERRED EMBODIMENTS

Figure 1:
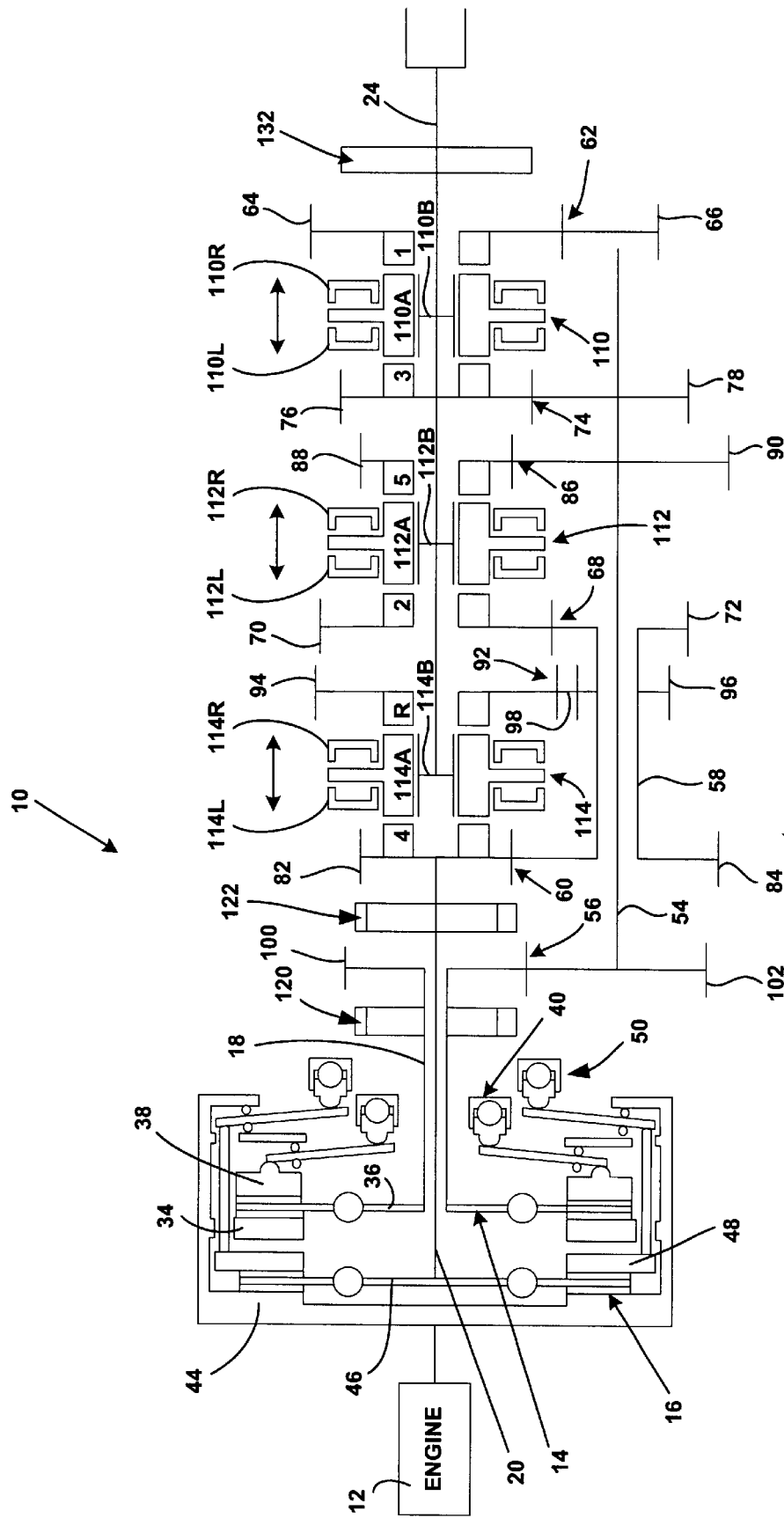
FIG. 1 is a schematic view of a twin-clutch automated transmission according to the principles of the present invention.
Figure 2:
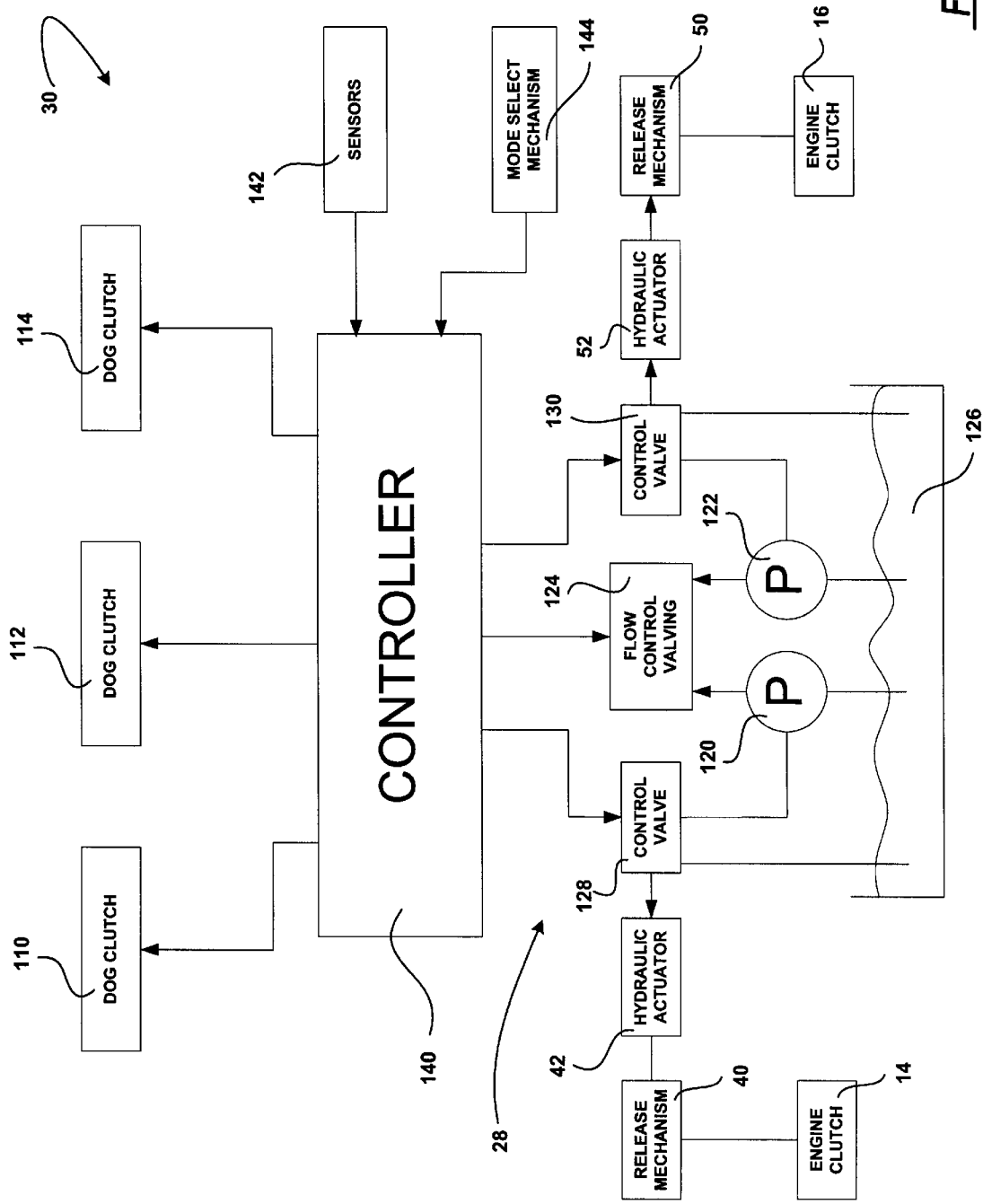
FIG. 2 is a diagrammatical illustration of the transmission control system adapted for use with the twin-clutch automated transmission shown in FIG. 1.

With reference to FIGS. 1 and 2 of the accompanying drawings, a twin-clutch automated transmission, hereinafter referred to as transmission 10, will now be described. Transmission 10 is driven by the output of an engine 12 and generally includes a first engine clutch 14, a second engine clutch 16, a first input shaft 18, a second input shaft 20, a split-path geartrain 22, an output shaft 24, a clutch control system 28, and a shift control system 30.

First engine clutch 14 is a hydraulically-actuated spring-apply plate-type clutch which is normally operable in its engaged state to establish a drive connection between the output of engine 12 and first input shaft 18. Likewise, second engine clutch 16 is a hydraulically-actuated spring-apply plate-type clutch normally operable in its engaged state to establish a drive connection between the output of engine 12 and second input shaft 20. First engine clutch 14 includes a drive plate 34 fixed to the output of engine 12, a friction clutch plate 36 first input shaft 18, an apply plate 38, and a spring-biased release mechanism 40 acting on apply plate 38. Release mechanism 40 is moveable to engage and release the drive connection between drive plate 34 and friction clutch plate 36. An actuator 42 is provided to control movement of release mechanism 40. Preferably, actuator 42 is a hydraulically-actuated device that controls the position of release mechanism 40 (and thus the magnitude of engagement of first engine clutch 14) in response to the fluid pressure provided thereto.

Second engine clutch 16 includes a drive plate 44 fixed to drive plate 34, a friction clutch plate 46 fixed to second input shaft 20, an apply plate 48, and a spring-biased release mechanism 50 acting on apply plate 48. Release mechanism 50 is moveable to engage and release the drive connection between drive plate 44 and friction clutch plate 46. Similarly, an actuator 52 is provided to control movement of release mechanism 50. Actuator 52 is a hydraulically-actuated device that controls the position of release mechanism 50 (and thus the magnitude of engagement of second engine clutch 16) in response to the fluid pressure provided thereto. As will be detailed, clutch control system 28 is operable to control actuators 42 and 52 and, in turn, the engagement and release of engine clutches 14 and 16.

Geartrain 22 includes a first countershaft 54 driven by first input shaft 18 via a first headset 56, a second countershaft 58 driven by second input shaft 20 via a second headset 60, and a plurality of constant-mesh gearsets supported between output shaft 24 and countershafts 54 and 58. Specifically, geartrain 22 includes six gearsets arranged to establish five forward ratio drive connections and a reverse ratio drive connection. A first gearset 62 includes a first speed gear 64 rotatably supported on output shaft 24 which is meshed with a first drive gear 66 fixed to first countershaft 54. A second gearset 68 includes a second speed gear 70 rotatably supported on output shaft 24 which is meshed with a second drive gear 72 fixed to second countershaft 58. A third gearset 74 includes a third speed gear 76 rotatably supported on output shaft 24 which is meshed with a third drive gear 78 fixed to first countershaft 54. Second headset 60 acts as the fourth gearset which includes a fourth speed gear 82 fixed to second input shaft 20 which is meshed with a fourth drive gear 84 fixed to second countershaft 58. A fifth gearset 86 includes a fifth speed gear 88 rotatably supported on output shaft 24 which is meshed with a fifth drive gear 90 fixed to first countershaft 54. Finally, a sixth gearset 92 includes a reverse speed gear 94 rotatably supported on output shaft 24, a reverse drive gear 96 fixed to second countershaft 58, and a reverse idler gear 98 meshed with reverse speed gear 94 and reverse drive gear 96. Thus, the first, third and fifth forward ratio drive connections are established between first countershaft 54 and output shaft 24 while the second and fourth forward drive connections and the reverse drive connection are established between second countershaft 58 and output shaft 24.

To provide a robust, compact packaging, first input shaft 18 is concentrically supported on second input shaft 20 while second countershaft 58 is concentrically supported on first countershaft 54. To provide a fixed ratio drive connection between first input shaft 18 and first countershaft 54, first headset 56 includes a first input gear 100 fixed to first input shaft 18 which is meshed with a first transfer gear 102 fixed to first countershaft 54. Likewise, second headset 60 provides a second fixed ratio drive connection between second input shaft 20 and second countershaft 58 and, as noted, includes fourth speed gear 82 fixed to second input shaft 20 which is meshed with fourth drive gear 84 fixed to second countershaft 58.

Shift control system 30 includes a plurality of electrically-actuated dog clutches which are operable for selectively coupling a selected speed gear to output shaft 24 for establishing the five forward and one reverse speed ratio drive connections. These electrically-actuated dog clutches include a first dog clutch 110 operable for selectively coupling/releasing first speed gear 64 and third speed gear 76 to/from output shaft 24, a second dog clutch 112 operable for selectively coupling/releasing second speed gear 70 and fifth speed gear 88 to/from output shaft 24, and a third dog clutch 114 operable for selectively coupling/releasing fourth speed gear 82 and reverse speed gear 94 to/from output shaft 24. Each dog clutch includes a sliding sleeve (denoted by the suffix "A") which is splined for rotation with and axial movement on a clutch hub (denoted by the suffix "B") which, in turn, is fixed to output shaft 24. As is conventional, bi-directional axial movement of the sliding sleeves from the neutral, central uncoupled positions shown results in clutched engagement with the adjacent speed gear. Preferably, each dog clutch is of the electromagnetic type having a pair of coils (denoted by suffixes "L" and "R") adjacent to and facing a radial armature plate segment of each sliding sleeve. Electrical power delivered to the coils causes controlled axial movement of the shift sleeves. It is to be understood that any other type of power-operated device capable of moving each sliding sleeve between its uncoupled and coupled positions is within the scope of this invention.

Clutch control system 28 includes a first hydraulic pump 120 driven by first input shaft 18, a second hydraulic pump 122 driven by second input shaft 20, and flow control valving 124 interconnecting first pump 120 and second pump 122. Preferably pumps 120 and 122 are shaft-driven pumps, such as gerotor pumps, but can optionally be electrically controlled if desired. As schematically shown in FIG. 2, pumps 120 and 122 draw fluid from a sump 126 internal to transmission 10. Clutch control system 28 further includes a first electrically-controlled control valve 128 providing fluid communication between actuator 42 and first pump 120, and a second electrically-controlled control valve 130 providing fluid communication between actuator 52 and second pump 122. First control valve 128 is operable to deliver/vent fluid to/from a pressure chamber within which a piston associated with first actuator 42 is located. The piston acts on release mechanism 40 such that movement of the piston controls movement of release mechanism 40 which, in turn, controls the magnitude of frictional clutch engagement between drive plate 34 and clutch plate 36, thereby controlling the drive connection between first input shaft 18 and engine 12. Likewise, second control valve 130 is operable to deliver/vent fluid to/from a pressure chamber within which a piston associated with second actuator 52 is located. The position of this piston controls release mechanism 50 which controls the magnitude of frictional clutch engagement between drive plate 44 and clutch plate 46, thereby controlling the drive connection between second input shaft 20 and engine 12. Thus, first and second control valves 128 and 130 are capable of providing variable pressure control and, preferably, are pulse-width modulated (PWM) valves.

In operation, rotation of first input shaft 18 causes first pump 120 to draw fluid from internal sump 126 and supply high pressure fluid to first control valve 128. Likewise, rotation of second input shaft 20 causes second pump 122 to supply pressure fluid to second control valve 130. In addition, flow control valving 124 functions to regulate the transfer of high-pressure fluid between hydraulic pumps 120 and 122 such that the pump associated with the released (i.e., non-driven) one of input shafts 18 and 20 acts as a motor/brake for advancing/retarding the speed of the non-driven input shaft into speed synchronization with output shaft 24. Thus, pumps 120 and 122 act as hydraulic synchronizers which function to synchronize the speed of output shaft 24 to input shafts 18 and 20 prior to actuation of any of the electrically-actuated dog clutches.

Geartrain 22 is shown in FIG. 1 to further include a parking wheel 132 fixed to output shaft 24 and which can be selectively engaged by a parking pawl (not shown) for releasably locking output shaft 24 to a stationary member (i.e., the housing of transmission 10) to selectively prevent rotation of output shaft 24. The parking pawl is operable to release output shaft 24 when the gearshift lever is moved out of its PARK position and lock output shaft 24 when the gearshift lever is returned to its PARK position.

In addition to the above, transmission 10 includes a transmission controller 140 which receives various sensor input signals, denoted diagrammatically by block 142. Transmission controller 140 is an electronically-controlled unit capable of receiving data from the vehicle sensors and generating output signals in response to the sensor input signals. The input signals delivered to controller 140 can include, without limitation, engine speed, throttle position, brake status, input shaft speeds and output shaft speed. Controller 140 is operable to coordinate and monitor actuation of all the electrically-controlled devices associated with clutch control system 28 and shift control system 30, so as to permit powershifted sequential gear changes automatically without any input from the vehicle operator. As such, transmission 10 is capable of being smoothly shifted automatically without power interruption. If desired, a manually-operable mode selector switch 144 can be provided to shift transmission 10 from its automatic shift mode to a manual shift mode. Mode switch 144 would, when actuated, allow the vehicle operator to shift the gearshift lever manually to effect sequential gear shifts (without use of a clutch pedal). However, controller 140 would only permit the selected gearshift to be completed if the current vehicle characteristics (i.e., engine speed, vehicle speed, etc.) permit completion of the requested shift.

When it is desired to operate the vehicle, engine 12 is started with the gearshift lever in its PARK position and both engine clutches 14 and 16 engaged such that both input shafts 18 and 20 are in drive connection with the output of engine 12. However, all of the electrically-actuated dog clutches are released with each shift sleeve located in its neutral uncoupled position, whereby no drive torque is delivered through geartrain 22 to output shaft 24. When the vehicle operator moves the gearshift lever from the PARK position to the DRIVE position, the parking pawl is released and first engine clutch 14 is also released. In particular, controller 140 actuates first control valve 128 to move actuator 42 for releasing first engine clutch 14, whereby the drive connection between engine 12 and first input shaft 18 is released. However since second engine clutch 16 is still engaged, driven rotation of second input shaft 20 causes second pump 122 to supply pressurized fluid through flow control valving 124 to first pump 120 which then acts as a brake to stop rotation of first input shaft 18. Thereafter, first dog clutch 110 is actuated by controller 140 sending an electrical signal to coil 110R for moving sliding sleeve 110A into clutched engagement with first speed gear 64. As such, first speed gear 64 is coupled for rotation with output shaft 24, whereby power is transferred from first input shaft 18 through first headset 56, first countershaft 54 and first gearset 62 to output shaft 24 so as to establish the first forward speed ratio drive connection between first input shaft 18 and output shaft 24. First engine clutch 14 is then gradually engaged to accelerate the vehicle.

Thereafter, when the vehicle operating parameters indicate a need to shift into the second forward gear ratio, controller 140 actuates second control valve 130 to move actuator 52 for releasing second engine clutch 16, whereby the drive connection between engine 12 and second input shaft 20 is released. Since first engine clutch 14 is engaged, first pump 120 delivers fluid to second pump 122 which then acts to retard rotation of second input shaft 20 so as to synchronize its rotary speed to that of output shaft 24. When controller 140 determines that speed synchronization is complete, second dog clutch 112 is actuated by controller 140 sending electric power to energize coil 112L for moving sliding sleeve 112A into clutched engagement with second speed gear 70. As such, second speed gear 70 is coupled for rotation with output shaft 24 such that power is transferred from second input shaft 20 through second headset 60, second countershaft 58, and second gearset 68 to output shaft 24 for establishing the second forward speed drive connection. Thereafter, controller 140 coordinates the release of first engine clutch 14 and the re-engagement of second engine clutch 16. Once first engine clutch 14 is released completely, controller 140 causes first dog clutch 110 to return sliding sleeve 110A to its neutral position for uncoupling first speed gear 64 from first input shaft 18.

To automatically establish the third forward gear ratio, second pump 122 driven by second input shaft 20 delivers pressurized fluid through valving 124 to first pump 120 for causing the rotary speed of non-driven first input shaft 18 to be synchronized with that of output shaft 24. Upon completion of synchronization, controller 140 energizes coil 110L of first dog clutch 110 for moving sleeve 110A into clutched engagement with third speed gear 76. Thereafter, controller 140 coordinates the release of second engine clutch 16 and the engagement of first engine clutch 14. Once second engine clutch is released, second dog clutch 112 returns sleeve 122A to its neutral position for releasing second speed gear 70 from engagement with output shaft 24. As will be appreciated, this upshift process continues through each of the other forward speed gear ratios and likewise works in reverse for downshifts. With this powershift methodology, transmission 10 shifts between engine clutches in a power-on shift strategy (i.e., no power interruption). It should be noted that connection of fourth speed gear 82 to output shaft 24 via third dog clutch 114 establishes a direct drive ratio connection between second input shaft 20 and output shaft 24. As such, the fifth forward speed ratio is preferably an overdrive ratio.

Figure 3:
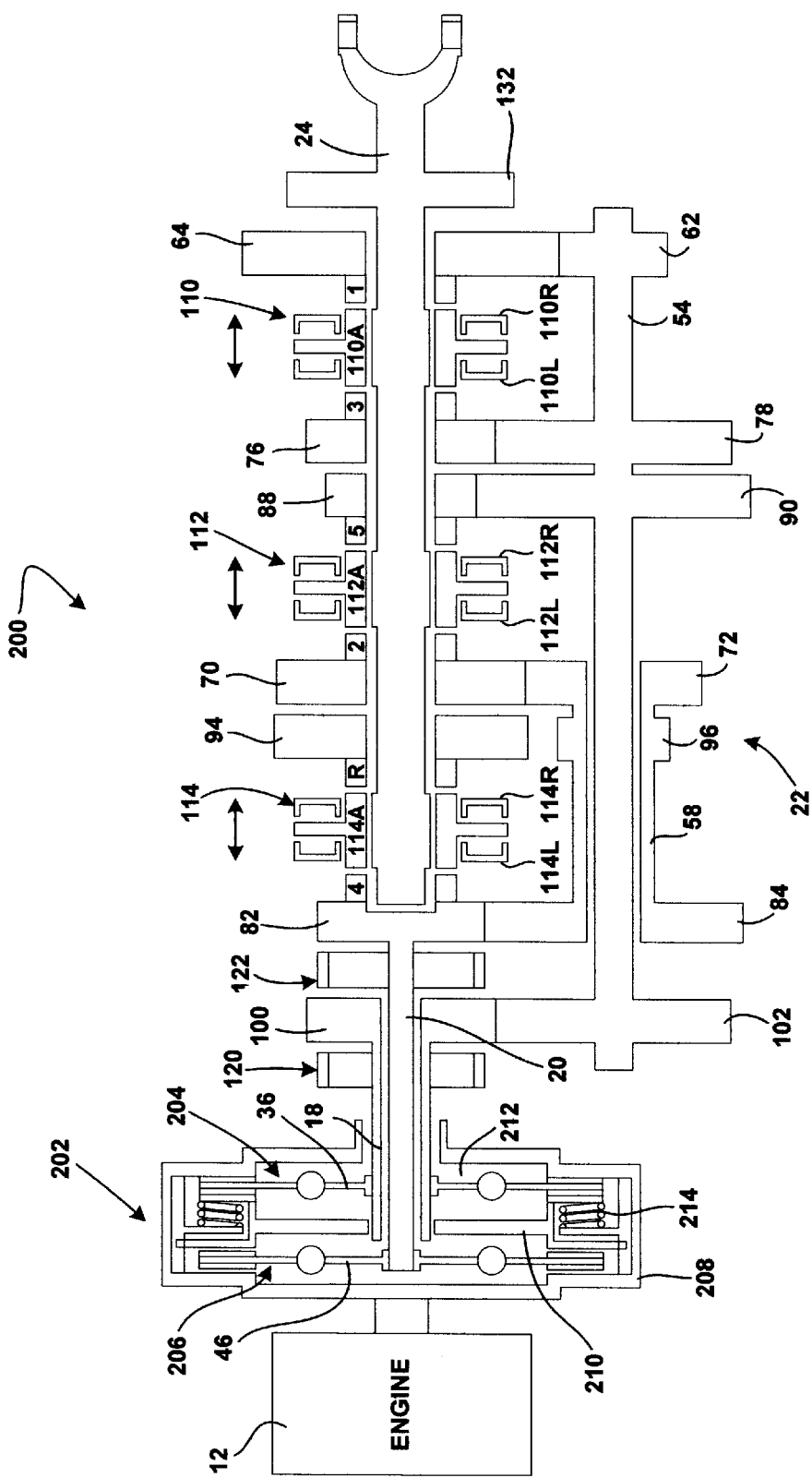
FIG. 3 is a schematic view of a twin-clutch automated transmission according to another preferred embodiment of the present invention.
Figure 4:
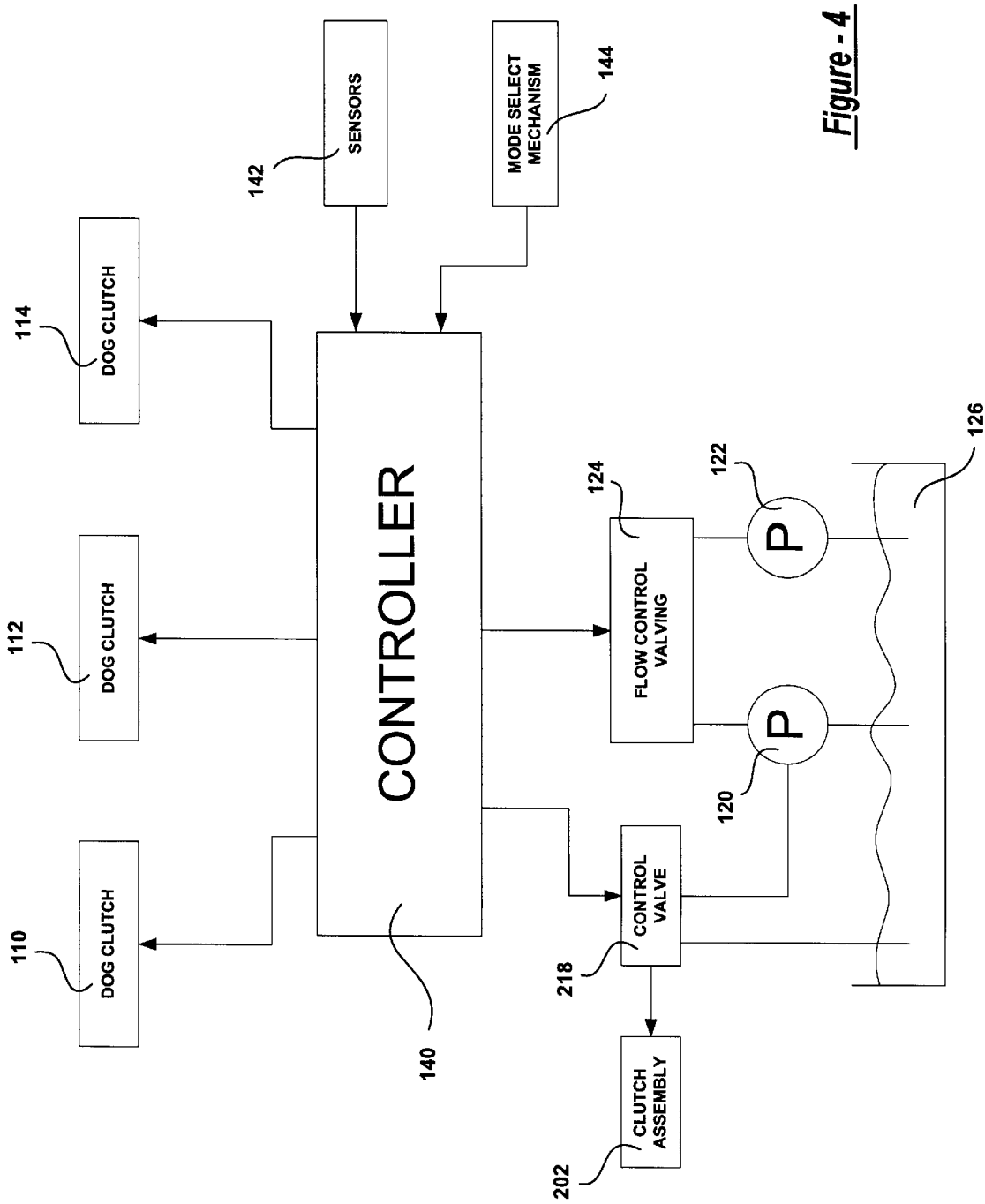
FIG. 4 is a diagram of the transmission control system adapted for use with the twin-clutch automated transmission shown in FIG. 3.

Referring now to FIGS. 3 and 4, a modified version of transmission 10 is shown and identified by reference numeral 200. As seen, transmission 200 is substantially identical to transmission 10 except that it is equipped with an engine clutch assembly 202 which replaces first engine clutch 14 and second engine clutch 16. In general, clutch assembly 202 includes a primary clutch 204 for establishing a drive connection with first input shaft 18 and a secondary clutch 206 for establishing a drive connection with second input shaft 20. Primary clutch 204 and secondary clutch 206 are disposed within an enclosed clutch housing 208 that is fixed to the output of engine 12. A spring-loaded piston 210 normally functions to frictionally clamp friction clutch plate 36 to housing 208 for establishing a drive connection between engine 12 and first input shaft 18. Concurrently, piston 210 is released from engagement with friction clutch plate 46 to disconnect engine 12 from second input shaft 20. The delivery of high pressure fluid to a pressure chamber 212 within housing 208 functions to overcome the biasing of springs 214 and move piston 210 to a position whereat friction plate 36 is released from frictional engagement with housing 208 and friction plate 46 is frictionally clamped to housing 208. Thus, the drive connection between engine 12 and first input shaft 18 is released and the drive connection between engine 12 and second input shaft 20 is established. Primary clutch 204 is arranged to drive first input shaft 18 since input shaft 18 drives the section of geartrain 22 having the highest (i.e., $5^{th}$ gear) forward gear, whereby no hydraulic pressure is required at cruise speeds so as to reduce parasitic losses.

As shown in FIG. 4, a control valve 218 is supplied with fluid from one of pumps 120 and 122 and is controlled by controller 140 for selectively supplying or venting high pressure fluid to chamber 212 so as to control actuation of engine clutch assembly 202. Thus, clutch assembly 202 eliminates the release mechanisms associated with transmission 10 and one control valve so as to simplify the clutch control system.

While presently preferred embodiments of the present invention have been shown and described, it is to be understood that these disclosures are for the purpose of illustration and that various changes and modifications may be made without departing from the scope of the invention as set forth in the following claims.

What is claimed is:

1. A twin-clutch transmission for use in a motor vehicle having an engine and a driveline, comprising:
   an output shaft adapted for connection to the driveline;
   a first input shaft driving a first countershaft;
   a second input shaft driving a second countershaft;
   a first engine clutch operable for establishing a releasable drive connection between the engine and said first input shaft;
   a second engine clutch operable for establishing a releasable drive connection between the engine and said second input shaft;
   a first constant-mesh gearset driven by said first countershaft;
   a second constant-mesh gearset driven by said second countershaft;
   a first shift clutch for releaseably engaging said first gearset to establish a drive connection between said first countershaft and said output shaft;
   a second shift clutch for releasably engaging said second gearset to establish a drive connection between said second countershaft and said output shaft;
   a first fluid pump driven by said first input shaft;
   a second fluid pump driven by said second input shaft; and
   a flow path connecting said first pump to said second pump such that when said first engine clutch and first shift clutch are engaged and said second engine clutch and second shift clutch are released, driven rotation of said first input shaft causes high pressure fluid to be transferred through said flow path from said first pump to said second pump for synchronizing the rotary speed of said second gearset driven by said released second input shaft to that of said output shaft.

2. The twin-clutch transmission of claim 1 further comprising:
   a third constant-mesh gearset driven by said first countershaft; and
   a fourth constant-mesh gearset driven by said second countershaft;
   wherein said first shift clutch is operable to releasably couple said third gearset to said output shaft, and said second shift clutch is operable to releasably couple said fourth gearset to said output shaft.

3. The twin-clutch transmission of claim 2 wherein said first and second engine clutches and said first and second shift clutches are power-operated devices controlled by a transmission controller for automatically shifting sequentially between a first gear ratio established by said first gearset, a second gear ratio established by said second gearset, a third gear ratio established by said third gearset, and a fourth gear ratio established by said fourth gearset.

4. The twin-clutch transmission of claim 3 wherein said first and second shift clutches are bi-directional electrically-actuated dog clutches.

5. The twin-clutch transmission of claim 3 wherein said first and second engine clutches are hydraulically-actuated and respectively include first and second electrically-controlled control valves supplied with fluid by said first and second pumps respectively.

6. The twin-clutch transmission of claim 1 wherein said first input shaft is tubular with said second input shaft rotatably supported by said tubular first input shaft.

7. The twin-clutch transmission of claim 6 wherein said first countershaft is coaxially supported for rotation on said second countershaft.

8. The twin-clutch transmission of claim 7 wherein said first gearset includes a first speed gear rotatably supported on said output shaft which is meshed with a first drive gear fixed to said first countershaft, and wherein said second gearset includes a second speed gear rotatably supported on said output shaft which is meshed with a second drive gear fixed to said second countershaft.

9. A twin-clutch transmission for use in a motor vehicle having an engine and a driveline, comprising:
   an output shaft adapted for connection to the driveline;
   first input shaft driving a first countershaft;
   a second input shaft driving a second countershaft;
   a first engine clutch operable for establishing a releasable drive connection between the engine and said first input shaft;
   a second engine clutch operable for establishing a releasable drive connection between the engine and said second input shaft;
   a geartrain including first and third drive gears fixed to said first countershaft; second and fourth drive gears fixed to said second countershaft, a first speed gear supported on said output shaft and meshed with said first drive gear, a second speed gear supported on said output shaft and meshed with said third drive gear, and a fourth speed gear supported on said output shaft and meshed with said fourth drive gear;
   a first shift clutch operable for releasable coupling said first and third speed gears to said output shaft;
   a second shift clutch operable for releasably coupling said second and fourth speed gears to said output shaft;
   a first fluid pump driven by said first input shaft;
   a second fluid pump driven by said second input shaft;
   a control valve permitting fluid flow between said first and second fluid pumps, and
   a transmission control system for controlling coordinated actuation of said first and second engine clutches to cause powershift sequential gear shifts, such that when one of said first and second input shafts is released from driven connection with the engine, said fluid pump associated with the driven one of said first and second input shafts supplies high pressure fluid through said control valve to said fluid pump associated with the released one of said first and second input shafts to synchronize the rotary speed of the released one of said first and second input shafts to said output shaft.

10. The twin-clutch transmission of claim 9 wherein said first and second engine clutches and said first and second shift clutches are power-operated devices controlled by a transmission controller for automatically shifting between a first gear ratio established by said first speed gear, a second gear ratio established by said second speed gear, a third gear ratio established by said third speed gear, and a fourth gear ratio established by said fourth speed gear.

11. The twin-clutch transmission of claim 10 wherein said first and second shift clutches are electrically-actuated dog clutches.

12. The twin-clutch transmission of claim 10 wherein said first and second engine clutches are hydraulically-actuated by first and second control valves controlled by said transmission controller and which are supplied with high pressure fluid by said first and second fluid pumps.

13. The twin-clutch transmission of claim 9 wherein said first input shaft is tubular with said second input shaft rotatably supported by said tubular first input shaft.

14. The twin-clutch transmission of claim 9 wherein said first countershaft is coaxially supported for rotation on said second countershaft.

15. An automated twin-clutch transmission adapted to transfer power from the engine to a driveline of a motor vehicle, comprising;

a first engine clutch operable to establish a releasable drive connection between the engine and a first input shaft;

a second engine clutch operable to establish a releasable drive connection between the engine and a second input shaft;

an output shaft adapted to transfer power to the driveline;

a first countershaft driven by said first input shaft;

a second countershaft driven by said second input shaft;

first and second constant-mesh gearsets interconnecting said first and second countershafts to said output shaft;

first and second power-operated dog clutches for selectively engaging said first and second gearsets;

a transmission controller for controlling coordinated actuation of said first and second engine clutches and said first and second dog clutches; and a clutch control system including a first fluid pump driven by said first input shaft for delivering high pressure fluid to a first control valve for selectively releasing said first engine clutch, a second fluid pump driven by said second input shaft for delivering high pressure fluid to a second control valve for selectively releasing said second engine clutch, and flow control valving for controlling fluid flow between said first and second fluid pumps in response to release of the drive connection between one of said first and second input shafts and the engine.

16. The automated twin-clutch transmission of claim 15 wherein when said first engine clutch and said first dog clutch are engaged and said second engine clutch and said second dog clutch are released, driven rotation of said first input shaft cause fluid to be transferred from said first fluid pump to said second fluid pump which acts to modify the rotary speed of said second gearset driven by said second input shaft to match with the rotary speed of said output shaft.

17. The automated twin-clutch transmission of claim 15 wherein said first and second dog clutches are electronically-actuated dog clutches.

18. The automated twin-clutch transmission of claim 15 wherein said first and second engine clutches are hydraulically-actuated by first and second electrically-actuated control valves that are supplied with high pressure fluid by said first and second fluid pump.

* * * * *